United States Patent
Lemaitre et al.

(10) Patent No.: US 7,951,228 B2
(45) Date of Patent: May 31, 2011

(54) SELF-PROPELLED VEHICLE COMPRISING AN ONBOARD EQUIPMENT SUPPLIED WITH FILTERED AIR

(75) Inventors: Isabel Lemaitre, Grenoble (FR); Olivier Vandroux, Grenoble (FR); Stéphane Lessi, Newark, DE (US)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 324 days.

(21) Appl. No.: 11/817,487

(22) PCT Filed: Feb. 27, 2006

(86) PCT No.: PCT/FR2006/050171
§ 371 (c)(1),
(2), (4) Date: Jun. 11, 2008

(87) PCT Pub. No.: WO2006/092526
PCT Pub. Date: Sep. 8, 2006

(65) Prior Publication Data
US 2009/0120295 A1    May 14, 2009

(30) Foreign Application Priority Data
Mar. 3, 2005 (FR) .................... 05 50567

(51) Int. Cl.
*B01D 53/04* (2006.01)
*B01D 61/00* (2006.01)
*B64D 13/00* (2006.01)

(52) U.S. Cl. ............ 96/4; 96/121; 96/134; 55/318; 244/135 R

(58) Field of Classification Search ............ 96/121, 96/130, 134, 135, 143, 4; 55/318, 385.1, 55/DIG. 35; 244/135 R; 454/76, 77
See application file for complete search history.

(56) References Cited

U.S. PATENT DOCUMENTS

| | | | | |
|---|---|---|---|---|
| 2,593,132 A * | 4/1952 | Gannon | ............ | 96/151 |
| 3,464,186 A * | 9/1969 | Walker et al. | ............ | 96/115 |
| 4,793,832 A * | 12/1988 | Veltman et al. | ............ | 95/14 |
| 4,881,953 A * | 11/1989 | Prasad et al. | ............ | 95/41 |
| 5,110,330 A * | 5/1992 | Loughran | ............ | 96/117.5 |
| 5,298,054 A * | 3/1994 | Malik | ............ | 95/99 |
| 5,858,063 A * | 1/1999 | Cao et al. | ............ | 95/11 |
| 6,547,188 B2 * | 4/2003 | Schmutz et al. | ............ | 244/135 R |
| 6,581,297 B1 | 6/2003 | Ginder | | |

(Continued)

FOREIGN PATENT DOCUMENTS
DE   19 823 796    2/2000
(Continued)

OTHER PUBLICATIONS
International Search Report for PCT/FR2006/050171, mailed Jun. 2006.
(Continued)

*Primary Examiner* — Frank M Lawrence
(74) *Attorney, Agent, or Firm* — Christopher J. Cronin

(57) ABSTRACT

The invention concerns a self-propelled vehicle, in particular an aircraft, comprising an onboard equipment such as an inerting system, means for vapour pollutant filtering (1) arranged between an air intake (8) connected to a compressed air source and an air outlet (9) connected to the equipment. The invention is characterized in that the vapour pollutant filtering means (1) comprise adsorption filtering means such as molecular sieve and/or activated carbon.

8 Claims, 1 Drawing Sheet

U.S. PATENT DOCUMENTS

Figure 1:
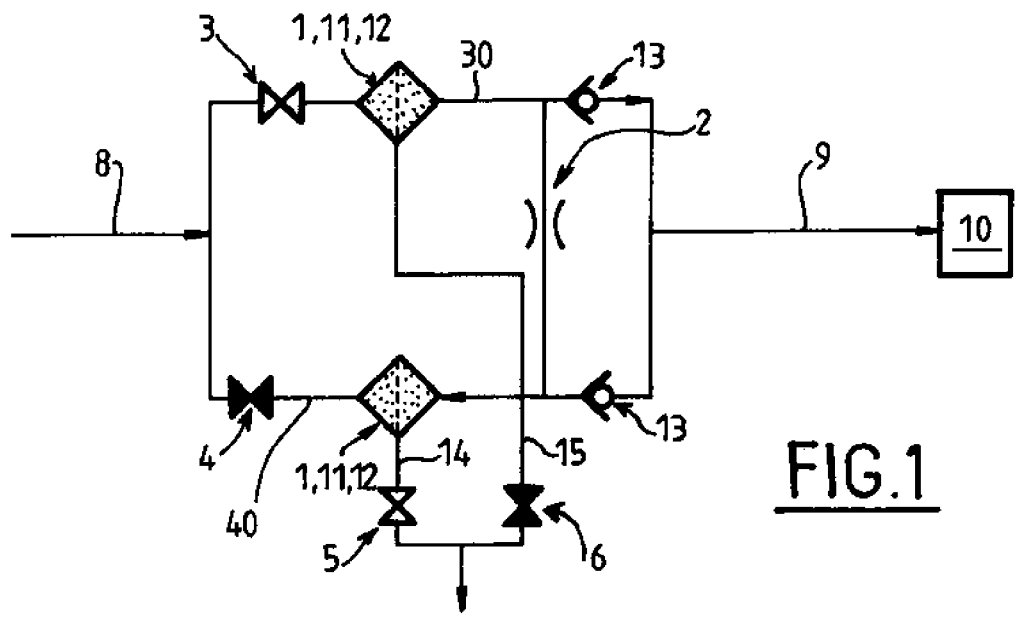

| | | |
|---|---|---|
| 7,175,692 B2 * | 2/2007 | Schwalm .......................... 95/22 |
| 2003/0145726 A1 | 8/2003 | Gueret et al. |
| 2004/0000353 A1 | 1/2004 | Jones |
| 2004/0244585 A1 | 12/2004 | Meckes et al. |

FOREIGN PATENT DOCUMENTS

| | | |
|---|---|---|
| FR | 2 819 451 | 7/2002 |
| FR | 2 855 145 | 11/2004 |
| WO | WO 91/12990 | 9/1991 |

OTHER PUBLICATIONS

PCT International Search Report for PCT/FR2006/050170, mailed Jul. 19, 2006.

French Search Report for FR 0550567, mailed Sep. 9, 2005.

* cited by examiner

SELF-PROPELLED VEHICLE COMPRISING AN ONBOARD EQUIPMENT SUPPLIED WITH FILTERED AIR

This application is a 371 of International PCT Application PCT/FR2006/050171, filed Feb. 27, 2006.

BACKGROUND

The present invention relates to a self-propelled vehicle comprising an onboard equipment supplied with filtered air.

The invention relates more specifically to a self-propelled vehicle, particularly an aircraft, comprising an onboard equipment such as an inerting system, vapor pollutant filtration means positioned between an air inlet connected to a compressed air source and an air outlet connected to the equipment.

In the context in particular of protecting aircraft (tank, compartments or other types of openings) against fire it is known practice to employ inerting systems that generate an oxygen-lean gas to replace the ambient air to prevent combustion.

One known solution for generating this inert gas is to supply pressurized air to membranes made up of polymer fibers the characteristics of which separate the nitrogen from the oxygen contained in the air. The air used may be bled from a circuit of the airplane or generated directly on board using a compressor.

These known devices are, however, sensitive to the contaminants liable to be present in the air.

One object of the invention is to propose a self-propelled vehicle, particularly an aircraft, comprising a filtration device for an onboard equipment which, while at the same time observing weight and size constraints, allows the pollutants present in the air to be filtered out adequately therefore considerably extending the life of the equipment.

This object is achieved through the fact that the vehicle, in other respects in accordance with the above preamble, is essentially characterized in that the vapor pollutant filtration means comprise adsorption filtration means of the molecular sieve and/or active carbon type.

Furthermore, the invention may have one or more of the following features:

- the vehicle comprises particle filtration means,
- the vehicle comprises coalescence filtration means,
- the vapor pollutant filtration means, the particle filtration means and the coalescence filtration means are incorporated into one and the same filter or into separate filters,
- the pollutant vapor filtration means, the particle filtration means and the coalescence filtration means are incorporated into one and the same filter, the vapor pollutant filtration means being positioned between first particle filtration means and first coalescence filtration means positioned upstream and second particle filtration means and second coalescence filtration means positioned downstream,
- the vehicle comprises, between the air inlet and the air outlet, a portion subdivided into two parallel air lines each comprising vapor pollutant filtration means, the device comprising regulating means for selectively regulating the air between the two parallel lines so as to allow the vapor pollutant filtration means of the two lines to operate and be regenerated alternately,
- each parallel air line comprises particle filtration means and coalescence filtration means,
- the particle filtration means and the coalescence filtration means are positioned upstream or downstream of the portion comprising the two parallel air lines,
- the vehicle comprises a connecting line connecting the downstream side of the filtration means of the first line to the downstream side of the filtration means of the second line, the connecting line comprising restriction means such as a calibrated orifice,
- the vehicle comprises selective removal means connected to the filtration means,
- the vehicle comprises nonreturn means such as at least one valve positioned between the vapor pollutant filtration means and the outlet,
- the selective removal means comprise a filtration means vent line associated with valve means.

Figure 2:
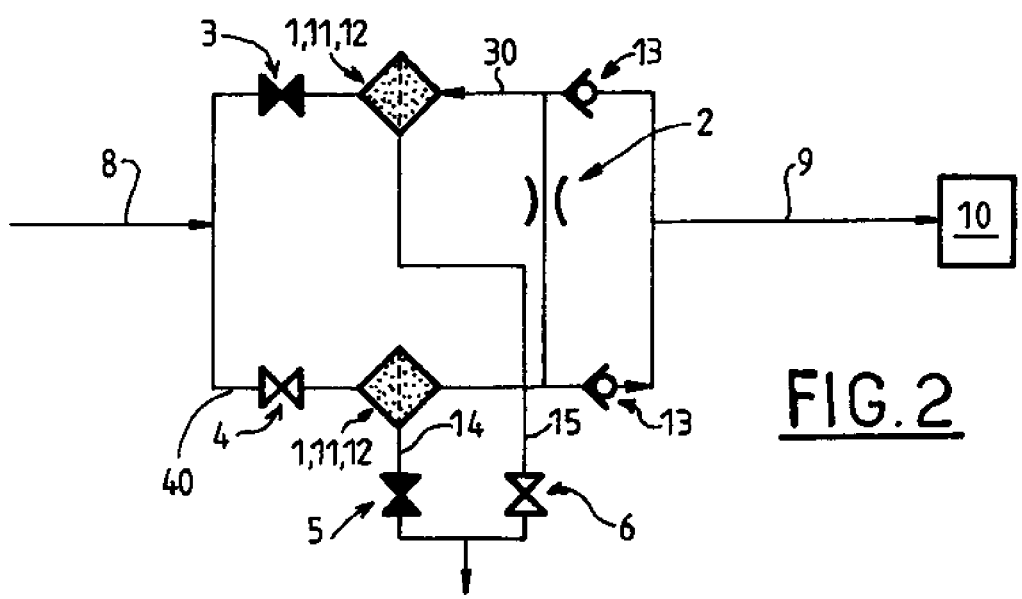
Figure 3:
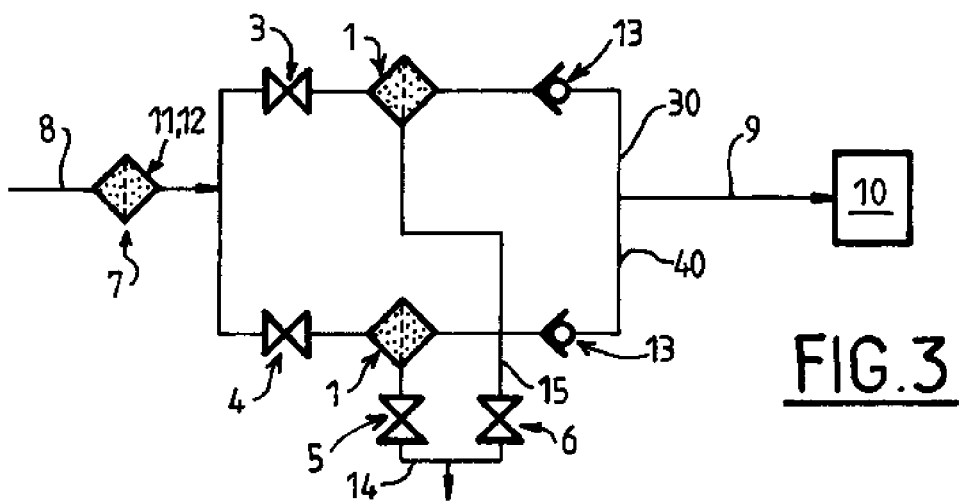

Other features and advantages of the invention will become better apparent from reading the description which follows, which is given with reference to the figures in which:

FIGS. 1 and 2 depict schematic views of a first embodiment of a filtration system according to the invention and according to two distinct operating sequences respectively and, FIG. 3 depicts a schematic view of another embodiment of the invention.

According to one advantageous feature of the invention, contaminants in vapor form are held back using an adsorption filtration system employing, for example, a molecular sieve and/or active carbon. This type of filtration involving adsorbing the vapor pollutants has the following advantages over other vapor filtration means (catalytic converters in particular): good filtration efficiency at the service temperatures of the membrane and the possibility of being regenerated under normal membrane conditions of use.

The device depicted in FIGS. 1 and 2 comprises an air inlet 8 intended, for example, to be connected to a compressed air source (such as a compression stage of a turbo machine used to propel the vehicle). Downstream, the air line comprises a duplicated portion forming two parallel air lines 30, 40. Each of the two lines 30, 40 comprises, from the upstream end downstream, a valve 3, 4, a filter (the assembly denoted by the references: 1, 11, 12) and a nonreturn valve 13.

Downstream of the nonreturn valve 13 the two lines 30, 40 meet at a single filtered air line which feeds into an equipment 10, for example an inerting system based on air separation membranes such as an "OBIGGS" (which stands for "On Board Inert Gas Generating System").

The nonreturn valves 13 positioned downstream of the filters 1, 11, 12 are designed to prevent the membranes of the equipment 10 positioned downstream from becoming depressurized during regeneration of the filters 1, 11, 12.

Furthermore, an air connecting line 2 connects the downstream side of the filter 1, 11, 12 of the first line 30 to the downstream side of the filter 1, 11, 12 of the second line 40. More specifically, the connecting line 2 is connected to the parallel lines 30, 40 upstream of the nonreturn valves 13 and comprises a calibrated orifice.

Finally, each filter 1, 11, 12 comprises a respective removal line 14, 15 provided with a valve 5, 6 to allow the filter 1, 11, 12 to be regenerated, for example by venting it to the atmosphere.

In this exemplary embodiment, the filter in each of the parallel lines 30, 40 comprises particle filtration means 11, coalescence filtration means 12 and means 1 for filtering pollutants in vapor form using adsorption. The vapor pollutant filtration means 1 preferably comprise filtration means of the molecular sieve and/or of the active carbon type.

For example, the vapor filtration means 1 comprise a layer of activated carbon positioned between two layers of media capable of arresting aerosols and particles respectively. Of course, other filtration techniques may also be envisioned, such as zeolites for example.

The proposed device makes it possible, throughout the flight of an aircraft employing it, for one of the two parallel filters 1, 1, 12 to be regenerated automatically while the other filter is being used to arrest the pollutants, and for this to be done without calling upon special purpose maintenance operations.

Throughout a flight, the device can operate in the following phases:
during a first sequence of determined duration (lasting between 10 and 120 minutes for example), a first filter 1, 11, 12 (first line 30) is used to arrest the pollutants in the air arriving at the equipment 10, while the second filter (second line 40) is being regenerated, then,
during a subsequent second sequence of determined duration (for example identical to the first phase), the filter 1, 11, 12 on the first line 30 is regenerated while the filter 1, 11, 12 on the second line 4 is used to arrest the pollutants in the air arriving at the equipment 10.

In this way, the regeneration of the pollutant vapor filtration stage 1 is total and the limit on the filter life is therefore determined by the particle and aerosol-arresting media(s).

FIG. 1 more specifically illustrates the first sequence described hereinabove. The pollutant-containing supply air is sent to the equipment 10 ("OBIGGS") by opening the valve 3 on the first line 30. At the same time, the valve 4 on the second line 40 and the valve 6 on the removal line from the filter 1, 11, 12 of the first line 3 are closed. Still at the same time, the valve 5 on the removal line 14 from the filter 1, 11, 12 of the second line 40 is opened. The second filter 1, 11, 12 is therefore depressurized by venting to atmosphere.

The air thus passes through the filter 1, 11, 12 of the first line 3 in which filter the pollutants are arrested. The first filter 1, 11, 12 is therefore under pressure, and the filtered air is sent to the membranes of the inerting equipment 10.

The calibrated orifice on the line 2 connecting the downstream side of the two filters allows a little hot clean air to be bled off to sweep countercurrently through the filter that is to be regenerated.

It is in this way that the layer of adsorbent in the second filter is regenerated.

FIG. 2 illustrates the above-mentioned second sequence in greater detail.

During this second sequence, the supply air containing any pollutants is sent to the equipment 10 via the second line 40 by opening the corresponding valve 4. The valve 6 on the removal line from the filter 1, 11, 12 of the first line 3 is open. Furthermore, the valve 3 of the first line 30 and the valve 5 on the removal line 14 from the second filter 1, 11, 12 are closed.

In this way, the air passes through the second filter 1, 11, 12 (line 40) in which the pollutants are arrested. The filter is then pressurized, and the filtered air is sent to the membranes of the equipment 10.

Opening the valve 6 on the removal line 15 from the first filter causes this filter to be depressurized by venting it to the atmosphere.

The calibrated orifice on the line 2 connecting the downstream sides of the two parallel filters allows a little clean hot air to be bled off to sweep countercurrently through the filter that is to be regenerated.

It is in this way that the layer of adsorbent of the filter first filter is regenerated.

FIG. 3 illustrates an alternative form of embodiment in which the particle filtration means 11 and the coalescence filtration means 12 are separate from the vapor pollutant filtration means 1.

For conciseness, elements identical to those described hereinabove are denoted by the same numerical references and are not described in detail twice.

Of course, the invention is not restricted to the above exemplary embodiments. For example, it is possible to use a single filter instead of two filters positioned in parallel. In this case, the single filter may comprise a removal duct fitted with a valve, the single filter being regenerated between two filtration sequences.

Furthermore, all or some of the valves 3, 4, 5 and 6 may be grouped together into a single unit (for example of the kind described in the applicant company's filed Patent Application No. EP 0 499 505).

Likewise, a heat exchanger, an exchanger bypass line and valve means may be provided on the air line in order selectively to send air to the exchanger and/or to the bypass line.

The invention makes it possible on the one hand to arrest pollutants present in vapor form and, on the other hand, to achieve separator membrane life that is long enough for use in civil aviation.

The invention affords good-quality filter regeneration and this contributes to a filtration device life that is longer than in known systems.

The device may additionally comprise filtration means of the catalytic converter type which modify the pollutant molecules by converting them into molecules that are harmless to the membrane.

The adsorption filtration system can be regularly regenerated thus allowing it to maintain its effectiveness and allowing it to be dimensioned with a mass and size that are compatible with the inert gas generation system.

The invention can also be used for regeneratable filtration of the cabin air of a vehicle, particularly an aircraft.

It will be understood that many additional changes in the details, materials, steps and arrangements of parts, which have been herein described in order to explain the nature of the invention, may be made by those skilled in the art within the principle and the scope of the invention as expressed in the appended claims. Thus, the present invention is not intended to be limited to the specific embodiments in the examples given above.

What is claimed is:
1. A self-propelled vehicle, particularly an aircraft, comprising:
an inerting system based on air separation membranes,
first and second air lines arranged in parallel positioned between an air inlet connected to a compressed air source and an air outlet connected to the inerting system, each of the first and second air lines comprising an associated vapor pollutant filtration means, wherein each of the vapor pollutant filtration means comprise adsorption filtration means of the molecular sieve and/or active carbon type,
at least one particle filtration means positioned between the air inlet and the air outlet,
at least one coalescence filtration means positioned between the air inlet and the air outlet, and
regulating means for selectively regulating the air between the first and second air lines so as to allow the vapor pollutant filtration means of the first air line and the vapor pollutant filtration means of the second air line to operate and be regenerated alternately.

2. The vehicle of claim 1, wherein the vapor pollutant filtration means, the particle filtration means and the coalescence filtration means are incorporated into one and the same filter or into separate filters.

3. The vehicle of claim 2, wherein
said at least one particle filtration means comprises first and second particle filtration means positioned upstream of the pollutant vapor filtration means of said first and second air lines, respectively,
said at least one particle filtration means comprises third and fourth particle filtration means postoned downstream of the pollutant vapor filtration means of said first and second air lines, respectively,
said at least one coalescence filtration means comprises first and second coalescence filtration means positioned upstream of the pollutant vapor filtration means of said first and second air lines, respectively,
said at least one coalescence filtration means comprises third and fourth coalescence filtration means postioned downstream of the pollutant vapor filtration means of said first and second air lines, respectively,
the pollutant vapor filtration means of the first air line, the first particle filtration means, the first coalescence filtration means, the third particle filtration means and the third coalescence filtration means are incorporated into a first filter,
the pollutant vapor filtration means of the second air line, the second particle filtration means, the second coalescence filtration means, the fourth particle filtration means and the fourth coalescence filtration means are incorporated into a second filter.

4. The vehicle of claim 1, wherein:
said at least one particle filtration means comprises first and second particle filtration means,
said at least one coalescence filtration means comprises first and second coalescence filtration means,
said first air line comprises said first particle filtration means and said first coalescence filtration means, and
said second air line comprises said second particle filtration means and said second coalescence filtration means.

5. The vehicle of claim 1, wherein the particle filtration means and the coalescence filtration means are positioned upstream or downstream of the first and second air lines.

6. The vehicle of claim 1, further comprising a connecting line connecting a downstream side of the pollutant vapor filtration means of the first air line to the downstream side of the pollutant vapor filtration means of the second air line, the connecting line comprising a calibrated orifice.

7. The vehicle of claim 1, further comprising selective removal means connected to the filtration means.

8. The vehicle of claim 1, further comprising:
a first nonreturn valve positioned between the vapor pollutant filtration means of the first air line and the outlet, and
a second nonreturn valve positioned between the vapor pollutant filtration means of the second air line and the outlet.

* * * * *